(12) United States Patent
Hayama et al.

(10) Patent No.: US 11,994,120 B2
(45) Date of Patent: May 28, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP); Yoshihiro Ogawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 604 days.

(21) Appl. No.: 17/256,947

(22) PCT Filed: Jul. 9, 2019

(86) PCT No.: PCT/JP2019/027073
§ 371 (c)(1),
(2) Date: Dec. 29, 2020

(87) PCT Pub. No.: WO2020/013156
PCT Pub. Date: Jan. 16, 2020

(65) Prior Publication Data
US 2021/0363980 A1    Nov. 25, 2021

(30) Foreign Application Priority Data
Jul. 12, 2018  (JP) ................................ 2018-132689

(51) Int. Cl.
*F16K 31/06*    (2006.01)
*F04B 27/18*    (2006.01)

(52) U.S. Cl.
CPC ...... *F04B 27/1804* (2013.01); *F16K 31/0624* (2013.01); *F04B 2027/1813* (2013.01);
(Continued)

(58) Field of Classification Search
CPC .......... F04B 27/1804; F04B 2027/1813; F04B 2027/1827; F04B 2027/1831;
(Continued)

(56) References Cited

U.S. PATENT DOCUMENTS

| 2,617,621 A | 11/1952 | James ..................... F16K 41/10 |
| 3,787,023 A | 1/1974 | Shufflebarger .......... F16K 41/10 |

(Continued)

FOREIGN PATENT DOCUMENTS

| EP | 1081378 | 3/2001 | ............. F04B 27/18 |
| EP | 2594794 | 5/2013 | ............. F04B 27/18 |

(Continued)

OTHER PUBLICATIONS

Translation of WO 2019146674, Aug. 2019, Daichi.*
(Continued)

*Primary Examiner* — William M McCalister
(74) *Attorney, Agent, or Firm* — HAYES SOLOWAY P.C.

(57) ABSTRACT

A capacity control valve includes a valve housing provided with a discharge port, suction ports, a control port allowing a control fluid of a control pressure Pc to pass therethrough and a primary valve including a primary valve seat and a primary valve body driven by a solenoid and opening and closing a communication between the discharge port and the control port by the movement of the primary valve body. The capacity control valve further includes a CS valve which includes a CS valve body, a first spring urging the CS valve body in a closing direction, and a second spring urging the CS valve body in an opening direction, the control port and the suction port being opened at a valve closed position of the primary valve body, the control port and the suction port being closed at a valve opened position of the primary valve body.

20 Claims, 7 Drawing Sheets

(52) U.S. Cl.
CPC .............. F04B 2027/1827 (2013.01); F04B 2027/1831 (2013.01); F04B 2027/1845 (2013.01); F04B 2027/1859 (2013.01); F04B 2027/1877 (2013.01)

(58) Field of Classification Search
CPC ...... F04B 2027/1845; F04B 2027/1859; F04B 2027/1877; F16K 31/0624; Y10T 137/86702; Y10T 137/8671
USPC ...................................... 137/625.68, 625.69
See application file for complete search history.

(56) References Cited

U.S. PATENT DOCUMENTS

| | | | |
|---|---|---|---|
| 4,166,607 A | 9/1979 | Webb | F16K 1/10 |
| 4,687,419 A * | 8/1987 | Suzuki | F04B 27/1804 417/270 |
| 6,010,312 A | 1/2000 | Suitou et al. | F04B 1/26 |
| 6,062,823 A | 5/2000 | Kawaguchi | F04B 27/1804 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 6,772,990 B2 | 8/2004 | Sasaki | F16K 31/0627 |
| 7,806,666 B2 | 10/2010 | Umemura | F04B 27/1804 |
| 8,021,124 B2 | 9/2011 | Umemura et al. | 417/222.2 |
| 8,079,827 B2 | 12/2011 | Iwa et al. | 417/222.2 |
| 8,757,988 B2 | 6/2014 | Fukudome | F04B 27/1804 |
| 9,132,714 B2 | 9/2015 | Futakuchi | B60H 1/00485 |
| 9,523,987 B2 | 12/2016 | Fukudome | G06D 7/0106 |
| 9,568,108 B2 | 2/2017 | Takahashi | F16J 15/3496 |
| 9,732,874 B2 | 8/2017 | Saeki | F04B 27/1804 |
| 9,777,863 B2 | 10/2017 | Higashidozono | F04B 27/1804 |
| 9,964,102 B2 | 5/2018 | Kondo | F04B 27/1045 |
| 10,697,548 B2 | 6/2020 | Iguchi | F16J 15/34 |
| 10,781,804 B2 | 9/2020 | Higashidozono et al. | F04B 27/18 |
| 10,883,606 B2 | 1/2021 | Takigahria | F16J 15/3452 |
| 11,053,933 B2 | 7/2021 | Warren | F04B 27/1804 |
| 11,085,431 B2 | 8/2021 | Fukudome | F04B 27/18 |
| 11,156,301 B2 | 11/2021 | Hayama | F16K 31/0627 |
| 11,225,962 B2 * | 1/2022 | Kurihara | G05D 7/0635 |
| 11,319,940 B2 * | 5/2022 | Hayama | F16K 11/0716 |
| 11,326,585 B2 | 5/2022 | Hayama et al. | F04B 27/1809 |
| 11,359,624 B2 | 6/2022 | Kurihara et al. | F04B 49/12 |
| 11,454,227 B2 | 9/2022 | Hayama | F04B 27/18 |
| 11,473,684 B2 | 10/2022 | Hayama | G04B 27/1804 |
| 11,480,166 B2 | 10/2022 | Hayama | F16K 31/0603 |
| 11,519,399 B2 | 12/2022 | Kurihara | F04B 49/22 |
| 11,536,257 B2 | 12/2022 | Hayama | F04B 27/10 |
| 11,542,931 B2 | 1/2023 | Hayama | F04B 49/22 |
| 11,555,489 B2 | 1/2023 | Hayama | F04B 27/10 |
| 2004/0060604 A1 | 4/2004 | Uemura et al. | 137/595 |
| 2005/0035321 A1 | 2/2005 | Uemura | F16K 27/041 |
| 2005/0287014 A1 * | 12/2005 | Umemura | F04B 27/1804 417/222.1 |
| 2006/0218953 A1 | 10/2006 | Hirota | 62/228.5 |
| 2007/0214814 A1 * | 9/2007 | Umemura | F04B 27/1804 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 * | 8/2012 | Futakuchi | F04B 27/1804 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0010410 A1 * | 1/2015 | Saeki | F25B 1/005 417/228 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 * | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | |
|---|---|---|---|
| EP | 2 784 320 | 10/2014 | F04B 27/18 |
| EP | 3 431 760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 10-148258 | 6/1998 | F16J 3/04 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO 2007/119380 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO 2014/091975 | 6/2014 | F04B 27/14 |
| WO | WO 2014/119594 | 8/2014 | F04B 27/14 |
| WO | WO2016104390 | 6/2016 | F16K 31/06 |
| WO | WO 2017/057160 | 4/2017 | F04B 27/18 |
| WO | WO 2017/159553 | 9/2017 | F04B 27/18 |
| WO | WO2018207461 | 11/2018 | F04B 27/18 |
| WO | WO-2019146674 A1 * | 8/2019 | F04B 27/18 |
| WO | WO2019167912 | 9/2019 | |

OTHER PUBLICATIONS

Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
European Official Action issued in related application serial No. 20782597.7, dated Oct. 19, 2022, 5 pages.
U.S. Official Action issued in related U.S. Appl. No. 17/256,955, dated Aug. 23, 2022, 17 pages.
U.S. Notice of Allowance issued in related U.S. Appl. No. 17/256,959, dated Sep. 7, 2022, 13 pages.
www.lexico.com/en/definition/connected accessed Aug. 15, 2022, Year 2022.
U.S. Official Action issued in related U.S. Appl. No. 17/299,285, dated Mar. 31, 2022, 11 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.

(56) References Cited

OTHER PUBLICATIONS

Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8. dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
Chinese Official Action issued in related application serial No. 201980046798.4, dated Dec. 5, 2022, with translation, 13 pages.
Chinese Official Action issued in related application serial No. 201980046750.3, dated Mar. 1, 2023, with translation, 12 pages.
Chinese Official Action issued in related application serial No. 202080026386.7, dated Oct. 31, 2022, with translation, 8 pages.
European Official Action issued in related application serial No. 19847690.5, dated Jul. 10, 2023, 4 pages.
U.S. Official Action issued in related U.S. Appl. No. 17/599,539, dated Apr. 25, 2023, 6 pages.
U.S. Official Action issued in related U.S. Appl. No. 17/417,701, dated Aug. 2, 2023, 11 pages.
U.S. Official Action issued in related U.S. Appl. No. 17/258,692, dated Aug. 3, 2023, 8 pages.
U.S. Official Action issued in related U.S. Appl. No. 17/600,547, dated Sep. 13, 2023, 13 pages.
U.S. Official Action issued in related U.S. Appl. No. 17/258,708, dated Sep. 25, 2023, 5 pages.
Notice of Allowance issued in related U.S. Appl. No. 17/599,539, dated Jul. 25, 2023, 4 pages.
Notice of Allowance issued in related U.S. Appl. No. 17/258,692, dated Sep. 27, 2023, 5 pages.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.

(56) References Cited

OTHER PUBLICATIONS

International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
First Office Action issued in Chinese Patent Appln. Serial No. 201980044409.4, dated Jan. 26, 2022, with English translation, 10 pages.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
Korean Official Action issued in related application serial No. 10-2021-7019897, dated Oct. 21, 2023, 10 pages.
U.S. Official Action issued in related U.S. Appl. No. 17/417,701, dated Nov. 9, 2023, 14 pages.
Notice of Allowance issued in related U.S. Appl. No. 17/258,708, dated Dec. 21, 2023, 6 pages.
Notice of Allowance issued in related U.S. Appl. No. 17/600,547, dated Nov. 28, 2023, 6 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.

* cited by examiner

CAPACITY CONTROL VALVE

TECHNICAL FIELD

The present invention relates to a capacity control valve for variably controlling a capacity of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected to the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber, by using a capacity control valve driven to be opened and closed by an electromagnetic force, while using a suction pressure Ps of a suction chamber sucking a fluid, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized and controlled by a control computer and performs normal control in which a valve body is moved in the axial direction by an electromagnetic force generated in a solenoid and a primary valve is opened and closed so as to adjust a control pressure Pc of the control chamber of the variable displacement compressor.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the primary valve of the capacity control valve is closed so as to decrease the pressure of the control chamber. Accordingly, the inclination angle of the swash plate becomes maximal.

Further, there is known a method of improving responsiveness of the variable displacement compressor by forming an auxiliary communication path which communicates a control port and a suction port of the capacity control valve with each other, discharging a refrigerant of the control chamber of the variable displacement compressor to the suction chamber of the variable displacement compressor through the control port, the auxiliary communication path, and the suction port at startup, and promptly decreasing the pressure of the control chamber at startup (see Patent Citation 1).

CITATION LIST

Patent Literature

Patent Citation 1: JP 5167121 B2 (Page 7, FIG. 2)

SUMMARY OF INVENTION

Technical Problem

However, in Patent Citation 1, the fluid discharge function is excellent at startup. However, when the energizing of the capacity control valve is controlled in the continuous driving state of the variable displacement compressor, the auxiliary communication path is in a communication state so that a refrigerant flows from the control port to the suction port. As a result, there is concern that the controllability of the pressure of the control chamber is poor and the operation efficiency of the variable displacement compressor is deteriorated. Further, since the auxiliary communication path is in a communication state when the capacity control valve is not energized and a refrigerant flows from the control port to the suction port, there is concern that the controllability when restarting the variable displacement compressor after a short time elapses from the stop state is poor and the operation efficiency of the variable displacement compressor is low.

The present invention has been made in view of such problems and an object of the present invention is to provide a capacity control valve having good operation efficiency while having a fluid discharge function at startup.

Solution to Problem

In order to solve the foregoing problems, a capacity control valve according to the present invention is a capacity control valve including a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough. The capacity control valve further includes a primary valve including a primary valve seat and a primary valve body driven by a solenoid and opening and closing a communication between the discharge port and the control port by a movement of the primary valve body The capacity control valve more further includes a CS valve which includes a CS valve body, a first spring configured to urge the CS valve body in a closing direction of the CS valve, and a second spring urging the CS valve body in an opening direction of the CS valve. The control port and the suction port are opened at a valve closed position of the primary valve body. The control port and the suction port are closed at a valve opened position of the primary valve body.

According to the aforesaid feature of the present invention, since the primary valve body is located at the valve closed position and the CS valve is opened so that the control port communicates with the suction port when starting the variable displacement compressor, a liquefied fluid is discharged from the control chamber into the suction chamber through the CS valve in a short time and the responsiveness at the startup can be improved. Further, since the primary valve body is located at the valve opened position and the CS valve is closed in the non-energized state of the solenoid of the capacity control valve, the control fluid passing through the control port does not flow into the suction port and the operation efficiency of the capacity control valve is high.

It may be preferable that a spring constant of the first spring is smaller than a spring constant of the second spring. According to this configuration, since an urging force difference between both springs promptly increases after the urging force of the first spring and the urging force of the second spring are balanced, the CS valve is reliably opened.

It may be preferable that a first end of the second spring is brought into contact with the CS valve body and a second end of the second spring is brought into contact with the primary valve body or a member connected to the primary valve body. According to this configuration, the capacity control valve with the CS valve has a simple structure.

It may be preferable that the CS valve body has a cylindrical shape, an inner periphery of the valve housing is provided with an annular step portion, and a part of the annular step portion constitutes a CS valve seat with and from which the CS valve body is brought into contact and separated. According to this configuration, the capacity control valve with the CS valve has a simple structure.

It may be preferable that the CS valve body is disposed so as to be slidable on an inner periphery of the valve housing. According to this configuration, the capacity control valve with the CS valve can be made compact.

It may be preferable that the spring constant of the second spring increases with a non-linear characteristic as an entire length of the second spring is shortened. According to this configuration, since the CS valve can be opened in the extreme vicinity of the valve closed position of the primary valve body, the control accuracy of the capacity control valve is high.

It may be preferable that the first spring and the second spring are coil springs. According to this configuration, the capacity control valve with the CS valve has a simple structure.

It may be preferable that the capacity control valve further includes a pressure drive valve which is opened and closed in accordance with the suction pressure, the primary valve body constitutes a part of a hollow rod provided with a hollow communication path capable of causing the control port to communicate with the suction port by opening and closing the pressure drive valve. According to this configuration, since a refrigerant can be discharged also by the pressure drive valve at the startup, the refrigerant can be promptly discharged.

It may be preferable that the suction port includes a first suction port and a second suction port, the first suction port, the discharge port, the control port, and the second suction port being sequentially disposed from the side of the solenoid. According to this configuration, since the control port and the second suction port are adjacent to each other, the capacity control valve with the CS valve has a simple structure.

It may be preferable that the CS valve includes sealing portions on both sides in an opening and closing direction thereof and both sealing portions have pressure receiving areas different from each other. According to this configuration, a differential pressure between the control pressure and the suction pressure can act in the opening and closing direction of the CS valve.

DESCRIPTION OF EMBODIMENTS

Modes for implementing a capacity control valve according to the present invention will be described on the basis of embodiments.

First Embodiment

A capacity control valve according to a first embodiment of the present invention will be described with reference to FIGS. 1 to 5. Hereinafter, the left and right sides as viewed from the front side in FIG. 2 will be described as the left and right sides of the capacity control valve.

A capacity control valve V according to the first embodiment of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
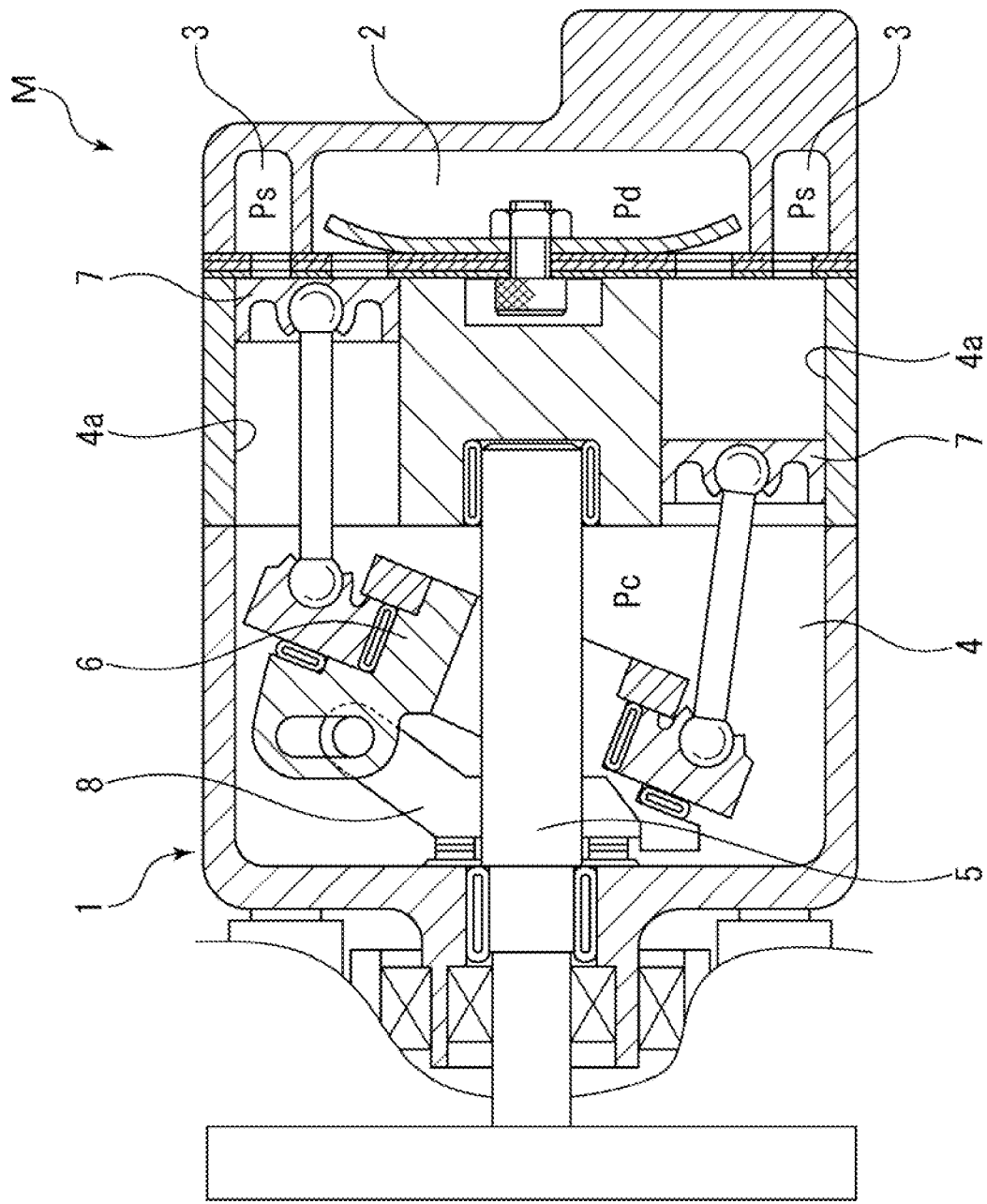
FIG. 1 is a schematic configuration diagram illustrating a swash plate type variable displacement compressor incorporated with a capacity control valve according to embodiments of the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4, by using the capacity control valve V driven to be opened and closed by an electromagnetic force, while using a suction pressure Ps of the suction chamber 3 sucking a fluid, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical state. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
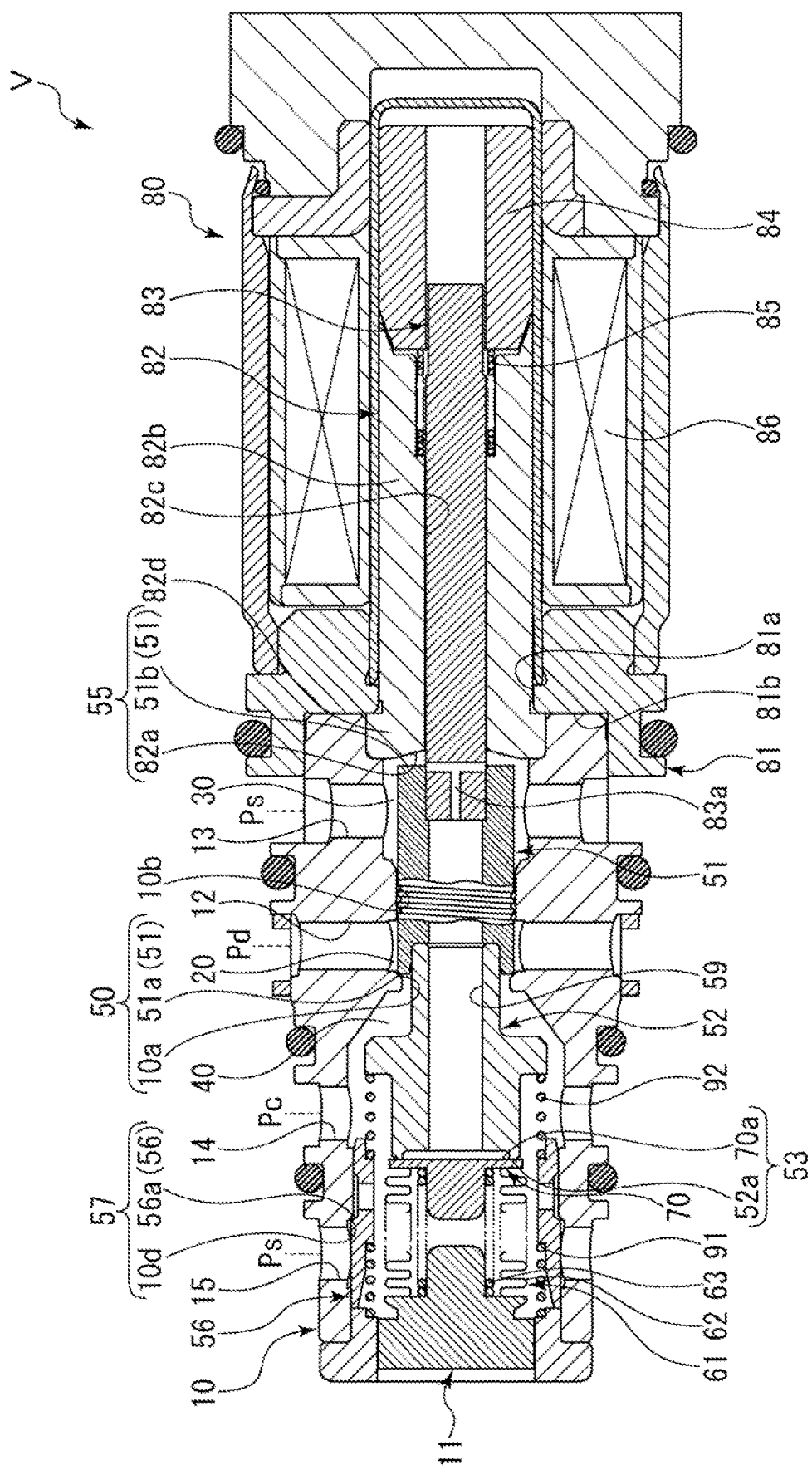
FIG. 2 is a cross-sectional view illustrating a case in which a primary valve is closed and a CS valve is opened in an energized state (startup state) of a capacity control valve according to the first embodiment.

As illustrated in FIG. 2, the capacity control valve V incorporated in the variable displacement compressor M variably controls the control pressure Pc in the control chamber 4 by controlling the fluid flowing into the control chamber 4 or flowing out from the control chamber 4 in such a manner that a current flowing through a coil 86 constituting a solenoid 80 is adjusted to control the opening and closing of a primary valve 50, a sub-valve 55, and a CS valve 57 of the capacity control valve V and a pressure-sensitive body 61 is operated by the suction pressure Ps of an intermediate communication path 59 corresponding to a hollow communication path to control the opening and closing of a pressure-sensitive valve 53 corresponding to a pressure drive valve.

In the embodiment, the primary valve 50 includes a primary sub-valve body 51 which corresponds to a primary valve body and a hollow rod and a primary valve seat 10a formed on an inner peripheral surface of a valve housing 10 and the primary valve 50 is opened and closed when a left axial end 51a of the primary sub-valve body 51 is brought into contact with and separated from the primary valve seat 10a. The pressure-sensitive valve 53 includes a cap 70 constituting the pressure-sensitive body 61 and a pressure-sensitive valve seat 52a formed in a left axial end of a pressure-sensitive valve member 52 corresponding to the hollow rod and the pressure-sensitive valve 53 is opened and closed when a seal surface 70a formed on the outer radial side of the right axial end of the cap 70 is brought into contact with and separated from the pressure-sensitive valve seat 52a. The sub-valve 55 includes the primary sub-valve body 51 and a sub-valve seat 82a formed on the opening end surface of the fixed iron core 82, that is, the left axial end surface and the sub-valve 55 is opened and closed when a right axial end 51b of the primary sub-valve body 51 is brought into contact with and separated from the sub-valve seat 82a. The CS valve 57 includes a CS valve body 56 and a CS valve seat 10d formed on the inner peripheral surface of the valve housing 10 and the CS valve 57 is opened and closed when a protruding end portion 56a formed at the substantially center of the outer peripheral surface of the CS valve body 56 in the axial direction is brought into contact with and separated from the CS valve seat 10d. Additionally, the CS valve 57 will be described in the subsequent stage.

Next, the structure of the capacity control valve V will be described. As illustrated in FIG. 2, the capacity control valve V mainly includes the valve housing 10 which is formed of a metal material or a resin material, the primary sub-valve body 51, the pressure-sensitive valve member 52, and the CS valve body 56 which are disposed in the valve housing 10 so as to be movable in a reciprocating manner in the axial direction, the pressure-sensitive body 61 which applies an urging force to the primary sub-valve body 51 and the pressure-sensitive valve member 52 in the rightward axial direction in response to the suction pressure Ps of the intermediate communication path 59, and the solenoid 80 which is connected to the valve housing 10 and applies a drive force to the primary sub-valve body 51, the pressure-sensitive valve member 52, and the CS valve body 56.

As illustrated in FIG. 2, the solenoid 80 mainly includes a casing 81 which includes an opening portion 81a opening to the left side in the axial direction, a substantially cylindrical fixed iron core 82 which is inserted into the opening portion 81a of the casing 81 from the left side in the axial direction and is fixed to the inner radial side of the casing 81, a drive rod 83 which is disposed on the inner radial side of the fixed iron core 82 so as to be movable in a reciprocating manner in the axial direction so that the left axial end portion is connected and fixed to a right axial end portion of the primary sub-valve body 51, a movable iron core 84 which is fixed to the right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 with a bobbin interposed therebetween.

The casing 81 is provided with a concave portion 81b of which an inner radial side of a left axial end is recessed rightward in the axial direction and a right axial end portion of the valve housing 10 is inserted and fixed to the concave portion 81b in a substantially sealed state.

The fixed iron core 82 is formed of a rigid body corresponding to a magnetic material such as iron or silicon steel and includes a cylindrical portion 82b which is provided with an insertion hole 82c extending in the axial direction so that the drive rod 83 is inserted therethrough and an annular flange portion 82d which extends outward in the radial direction from the outer peripheral surface of the left axial end portion of the cylindrical portion 82b and a sub-valve seat 82a is formed on a left axial end surface of the cylindrical portion 82b.

As illustrated in FIG. 2, the valve housing 10 is provided with a Pd port 12 which corresponds to a discharge port communicating with the discharge chamber 2 of the variable displacement compressor M, a first Ps port 13 which corresponds to a suction port and a first suction port communicating with the suction chamber 3 of the variable displacement compressor M, a Pc port 14 which corresponds to a control port communicating with the control chamber 4 of the variable displacement compressor M, and a second Ps port 15 which corresponds to a suction port and a second suction port communicating with the suction chamber 3 of the variable displacement compressor M and the first Ps port 13, the Pd port 12, the Pc port 14, and the second Ps port 15 are sequentially provided from the side of the solenoid 80.

Further, the valve housing 10 is formed in a bottomed cylindrical shape by press-inserting a partition adjustment member 11 into the left axial end portion in a substantially sealed state. Additionally, the partition adjustment member 11 can adjust an urging force of a first coil spring 91 corresponding to a first spring and a second coil spring 92 corresponding to a second spring (to be described later) partially constituting the pressure-sensitive body 61 and the CS valve 57 by adjusting the installation position of the valve housing 10 in the axial direction.

The primary sub-valve body 51, the pressure-sensitive valve member 52, and the CS valve body 56 are disposed in the valve housing 10 so as to be movable in a reciprocating manner in the axial direction and a part of the inner peripheral surface of the valve housing 10 is provided with a small-diameter guide surface 10b on which the outer peripheral surface of the primary sub-valve body 51 is slidable in a substantially sealed state. Further, the left axial end portion of the inner peripheral surface of the valve housing 10 is provided with an annular step portion 10f formed by an inner peripheral surface 10c which is provided with the second Ps port 15 extending from the left axial end surface of the valve housing 10 the rightward axial direction, a CS valve seat 10d which extends inward in the radial direction while being inclined from the right axial end of the inner peripheral surface 10c and with and from which the protruding end portion 56a of the CS valve body 56 is brought into contact and separated, and an inner peripheral surface 10e which extends from the inner radial side of the CS valve seat 10d the rightward axial direction (see FIGS. 3 to 5).

Further, a first valve chamber 20 which communicates with the Pd port 12 and in which the side of the left axial end 51a of the primary sub-valve body 51 is disposed, a second valve chamber 30 which communicates with the first Ps port 13 and in which the back pressure side of the primary sub-valve body 51, that is, the side of the right axial end 51b is disposed, and a pressure-sensitive chamber 40 which communicates with the Pc port 14 and the second Ps port 15 and in which the CS valve body 56 are disposed along with the pressure-sensitive body 61 are formed in the valve housing 10. Additionally, the second valve chamber 30 is defined by the outer peripheral surface of the primary sub-valve body 51, the left axial end surface of the fixed iron core 82, and the inner peripheral surface on the right side of the guide surface 10b of the valve housing 10 in the axial direction.

As illustrated in FIG. 2, the pressure-sensitive body 61 mainly includes a bellows core 62 which has a coil spring 63 embedded therein and the disk-shaped cap 70 which is provided in the right axial end of the bellows core 62 and the left axial end of the bellows core 62 is fixed to the partition adjustment member 11.

Further, the pressure-sensitive body 61 is disposed in the pressure-sensitive chamber 40 and the seal surface 70a of the cap 70 sits on the pressure-sensitive valve seat 52a of the pressure-sensitive valve member 52 by an urging force of moving the cap 70 rightward in the axial direction by the coil spring 63 and the bellows core 62.

Figure 3:
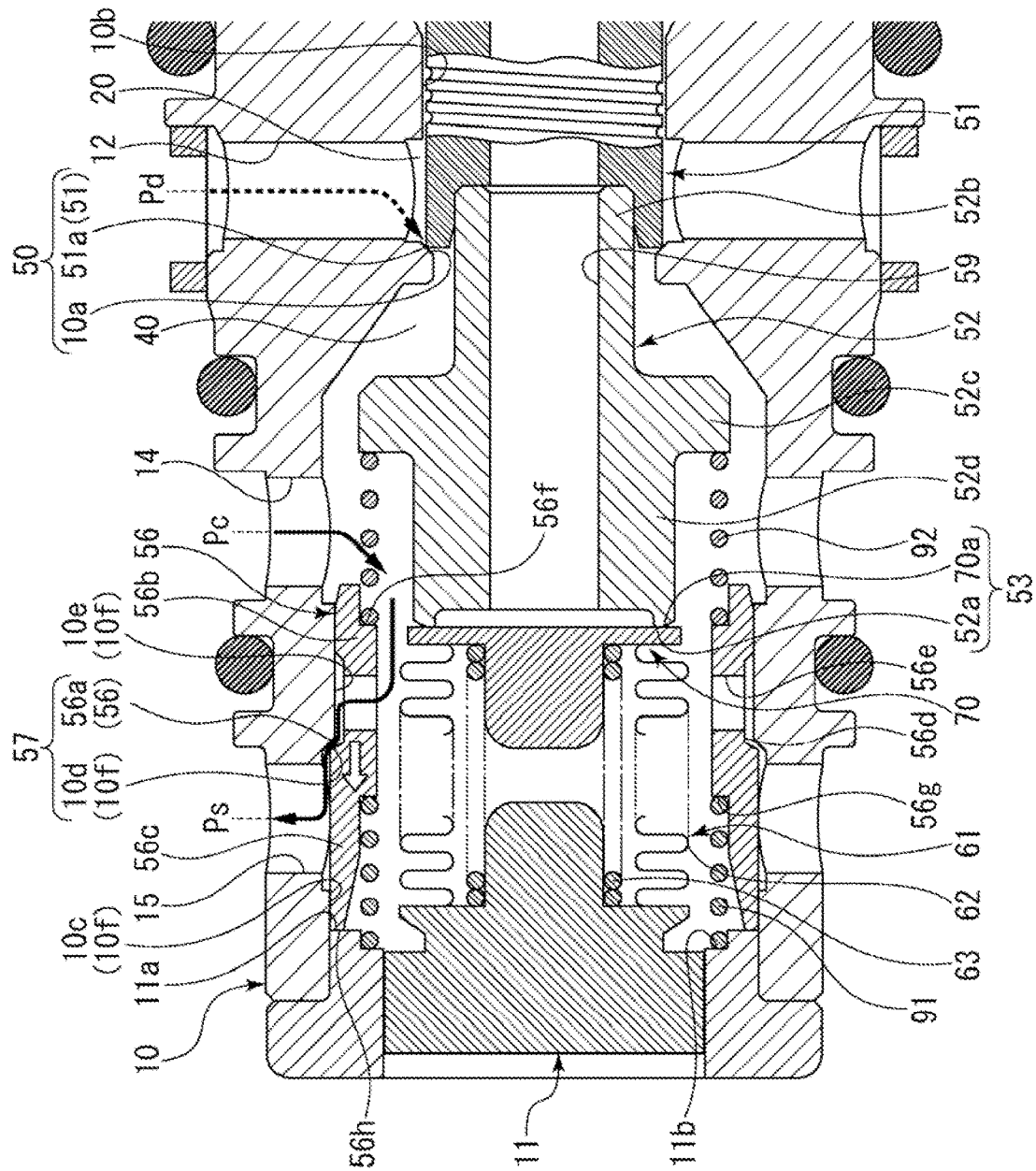
FIG. 3 is an enlarged cross-sectional view of FIG. 2 illustrating a case in which the primary valve is closed and the CS valve is opened in the energized state (startup state) of the capacity control valve according to the first embodiment.

As illustrated in FIGS. 2 and 3, the primary sub-valve body 51 is formed in a substantially cylindrical shape, the pressure-sensitive valve member 52 is connected and fixed to the left axial end portion, the drive rod 83 is connected and fixed to the right axial end portion, and these members are movable in the axial direction together. Additionally, the outer peripheral surface of the primary sub-valve body 51 and the guide surface 10b of the valve housing 10 are slightly separated from each other in the radial direction so that a minute gap is formed and the primary sub-valve body 51 slides on the valve housing 10 so as to be smoothly and relatively movable in the axial direction.

Further, the intermediate communication path 59 which penetrates in the axial direction is formed in the primary sub-valve body 51 and the pressure-sensitive valve member 52 by connecting hollow holes. Additionally, the intermediate communication path 59 can communicate with the second valve chamber 30 through a communication hole 83a formed in the left axial end portion of the drive rod 83 (see FIG. 2). In addition, for convenience of description, although not illustrated in the drawings, there is a case in which a high-pressure fluid is liquefied in the control chamber 4 when the variable displacement compressor M is stopped for a long time. However, when the variable displacement compressor M is started and the capacity control valve V is energized, the primary valve 50 is closed and the sub-valve 55 is opened so that the pressure-sensitive body 61 is contracted and the pressure-sensitive valve 53 is opened due to the high suction pressure Ps in the intermediate communication path 59. Accordingly, the liquid refrigerant of the control chamber 4 can be discharged to the suction chamber 3 in a short time through the intermediate communication path 59.

Figure 4:
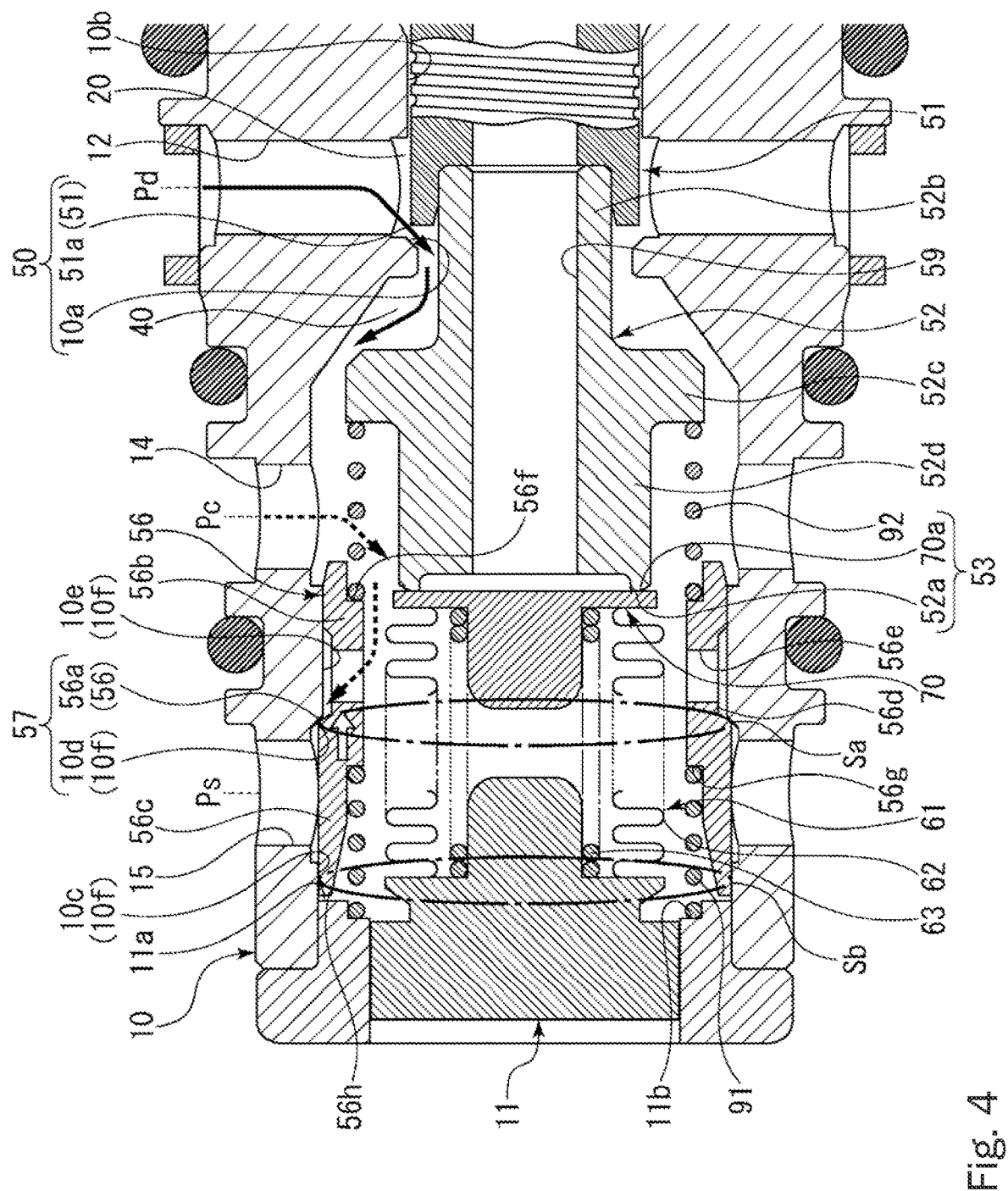
FIG. 4 is an enlarged cross-sectional view illustrating a case in which the primary valve is opened and the CS valve is closed in the non-energized state of the capacity control valve according to the first embodiment.
Figure 5:
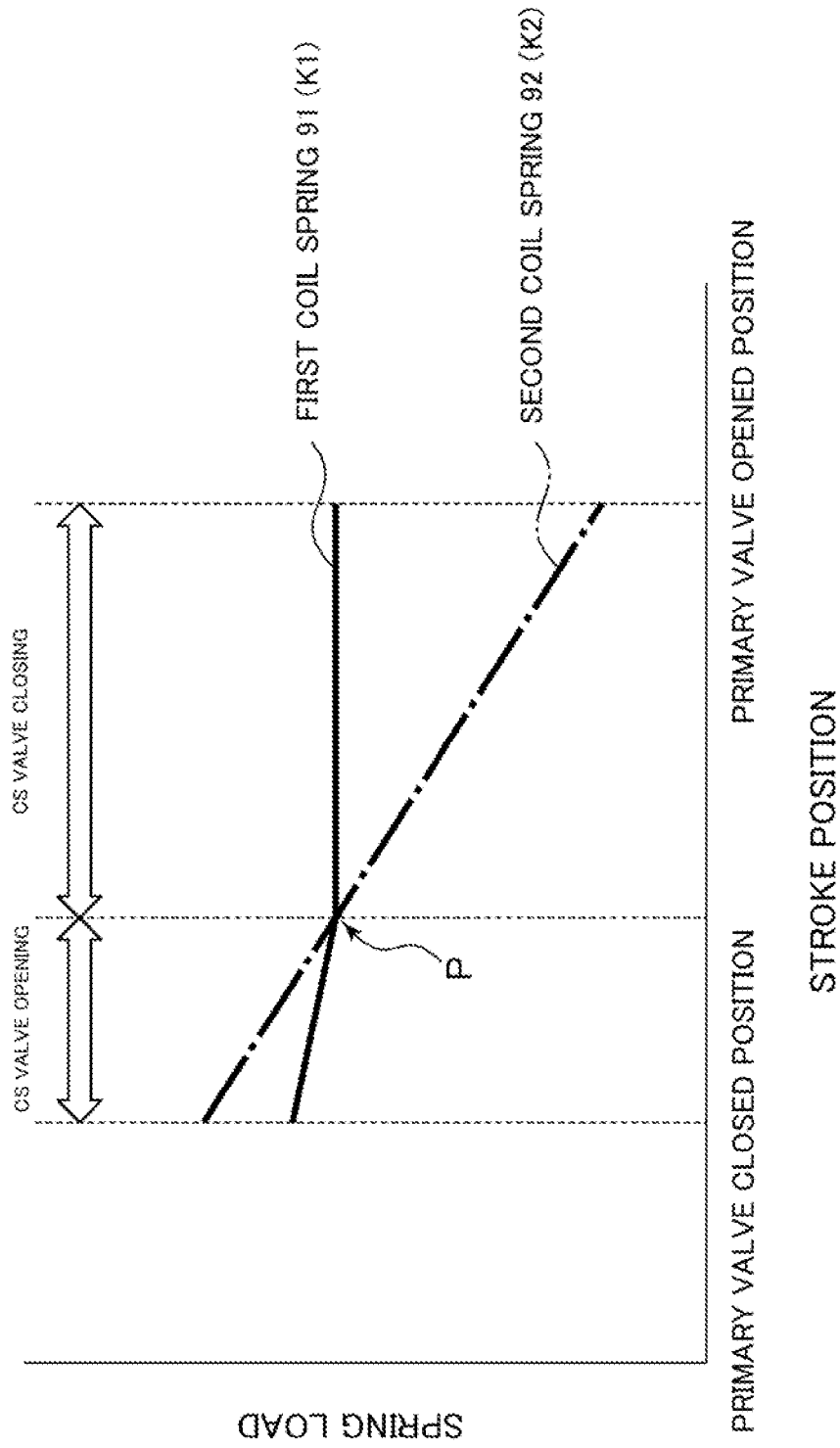
FIG. 5 is a graph showing a spring load acting on a first coil spring and a second coil spring with respect to a stroke position of a primary sub-valve body, an opened and closed state of the primary valve, and an opened and closed state of the CS valve of the first embodiment, where a stroke position of a horizontal axis indicates a movement direction of the primary sub-valve body (i.e., a direction from the left to the right in FIG. 2) when a current is applied to a solenoid.

As illustrated in FIGS. 3 to 5, the pressure-sensitive valve member 52 is formed in a cylindrical shape with a flange including a cylindrical portion 52b to which the left axial end portion of the primary sub-valve body 51 is connected and fixed, an annular flange portion 52c which extends outward in the radial direction from the outer peripheral surface of the left axial end portion of the cylindrical portion 52b, and a contact portion 52d which is formed on the left side of the flange portion 52c in the axial direction so as to have a diameter smaller than that of the flange portion 52c and is provided with the pressure-sensitive valve seat 52a brought into contact with and separated from the seal surface 70a of the cap 70 constituting the pressure-sensitive body 61. Further, the second coil spring 92 of the CS valve 57 externally fitted to the contact portion 52d of the pressure-sensitive valve member 52.

As illustrated in FIGS. 3 to 5, the CS valve body 56 is formed in a stepped cylindrical shape including a base portion 56b which is concentrically disposed on the outer radial side of the pressure-sensitive body 61 and the pressure-sensitive valve member 52 in the pressure-sensitive chamber 40 and is located at the right axial end portion and a contact portion 56c which is formed on the left side of the base portion 56b in the axial direction so as to have a diameter larger than that of the base portion 56b and is provided with the protruding end portion 56a brought into contact with and separated from the CS valve seat 10d formed on the inner peripheral surface of the valve housing 10. Additionally, the outer peripheral surface of the base portion 56b is separated from the inner peripheral surface 10e of the valve housing 10 in the radial direction and the outer peripheral surface of the contact portion 56c is separated from the inner peripheral surface 10c of the valve housing 10 in the radial direction so that a gap is formed therebetween and the CS valve body 56 is smoothly slidable in the axial direction by the sliding on the valve housing 10.

Further, since the CS valve body 56 is provided with an annular concave portion 56d which is formed in the left axial end portion of the outer peripheral surface of the base portion 56b so as to be recessed inward in the radial direction, an annular space is formed between the annular concave portion 56d and the inner peripheral surface 10e of the valve housing 10. Further, the annular concave portion 56d is provided with a through-hole 56e which penetrates in the radial direction so as to communicate the annular space with the pressure-sensitive chamber 40.

Further, a concave portion 56f is formed inside the CS valve body 56 so that the inner radial side of the right axial end of the base portion 56b is recessed in a stepped shape the leftward axial direction and the left axial end portion of the second coil spring 92 is internally fitted to the concave portion 56f. Further, a concave portion 56g is formed inside the CS valve body 56 so that the inner radial side of the left axial end of the contact portion 56c is recessed in a stepped shape the rightward axial direction and the right axial end portion of the first coil spring 91 is internally fitted to the concave portion 56g.

Additionally, the right axial end of the first coil spring 91 is brought into contact with the bottom surface of the concave portion 56g and the left axial end of the first coil spring 91 is brought into contact with the bottom surface of the concave portion 11b formed on the inner radial side of the partition adjustment member 11, so that the CS valve body 56 is urged in the rightward axial direction corresponding to the valve closing direction. Further, the left axial end corresponding to one end of the second coil spring 92 is brought into contact with the bottom surface of the concave portion 56f and the right axial end corresponding to the other end of the second coil spring 92 is brought into contact with the left axial end surface 52e of the flange portion 52c of the pressure-sensitive valve member 52, so that the CS valve body 56 is urged in the leftward axial direction corresponding to the valve opening direction.

Further, the first coil spring 91 and the second coil spring 92 are compression springs having the same diameter and the same axis and a spring constant k1 of the first coil spring 91 that urges the CS valve body 56 in the rightward axial direction corresponding to the valve closing direction is set to be smaller than a spring constant k2 of the second coil spring 92 that urges the CS valve body 56 in the leftward axial direction corresponding to the valve opening direction (i.e., k1<k2).

Further, the left axial end of the CS valve body 56, that is, the left axial end 56h of the contact portion 56c can be brought into contact with the right axial end surface 11a of the partition adjustment member 11 when the CS valve 57 is opened (see FIG. 3).

Next, the opening and closing mechanism of the CS valve 57 will be described. When the solenoid 80 is not energized, the primary valve 50 is opened and the primary sub-valve body 51 is located at the valve opened position (see FIG. 4). In this state, since a spring load of the first coil spring 91 is larger than a spring load of the second coil spring 92 as shown in FIG. 5, an urging force caused by the urging force difference between the first coil spring 91 and the second coil spring 92 is applied to the CS valve body 56 in the rightward axial direction corresponding to the valve closing direction (as indicated by a white arrow in FIG. 4) and the protruding end portion 56a of the CS valve body 56 is brought into contact with the CS valve seat 10d formed on the inner peripheral surface of the valve housing 10 so that the CS valve 57 is closed (see FIG. 4). In addition, a pressure receiving area of a sealing portion Sa in which the protruding end portion 56a of the CS valve body 56 is brought into contact with the CS valve seat 10d is the same as a pressure receiving area of a sealing portion Sb in which the outer peripheral surface of the contact portion 56c of the CS valve body 56 slides on the inner peripheral surface 10c of the valve housing 10. For that reason, the influence of the control pressure Pc applied from both sides in the axial direction is cancelled in a state in which the protruding end portion 56a of the CS valve body 56 is brought into contact with the CS valve seat 10d when closing the CS valve 57. Similarly, the influence of the suction pressure Ps applied to the CS valve body 56 from both sides in the axial direction is cancelled. Further, the CS valve 57 is not limited to one that perfectly blocks a gap between the protruding end portion 56a of the CS valve body 56 and the CS valve seat 10d of the valve housing 10 and may be configured to throttle the flow of the fluid from the Pc port 14 toward the second Ps port 15.

Further, when the solenoid 80 is energized from the opened state of the primary valve 50, the primary sub-valve body 51 moves the leftward axial direction. Referring to FIG. 5, when only the second coil spring 92 contracts due to the leftward movement of the primary sub-valve body 51 and the load of the second coil spring 92 increases so that the spring load of the second coil spring 92 is the same as the spring load of the first coil spring 91 (the intersection point P), the protruding end portion 56a of the CS valve body 56 is separated from the CS valve seat 10d of the valve housing 10 and both the first coil spring 91 and the second coil spring 92 contract so that the CS valve 57 starts to be opened. At this time, the primary valve 50 is not closed.

In the maximum energized state when energizing the solenoid 80, the primary sub-valve body 51 further moves the leftward axial direction so that the primary valve 50 is closed and the primary sub-valve body 51 is located at the valve closed position (see FIGS. 2 and 3). In this state, since the spring load of the second coil spring 92 is larger than the spring load of the first coil spring 91 as shown in FIG. 5, an urging force caused by the urging force difference between the first coil spring 91 and the second coil spring 92 is applied to the CS valve body 56 in the leftward axial direction corresponding to the valve opening direction (as indicated by a white arrow in FIG. 3) and the left axial end 56h of the CS valve body 56 is brought into contact with the right axial end surface 11a of the partition adjustment member 11 so that the CS valve 57 is opened (see FIG. 4).

Next, the operation of the capacity control valve V in the energized state (e.g., a startup state), the non-energized state, and the normal control state will be sequentially described.

First, the energized state (e.g. the startup state) will be described. When the variable displacement compressor M is started and the solenoid 80 of the capacity control valve V is energized after the variable displacement compressor M is left for a long time in a non-use state, the primary valve 50 is closed and the sub-valve 55 is opened. At this time, when the primary sub-valve body 51 is stroked from the valve closed position to the valve opened position, the primary sub-valve body is stroked to the vicinity of the valve closed position in relation to the intersection point P after the urging force of the first coil spring 91 and the urging force of the second coil spring 92 are balanced at the stroke position corresponding to the intersection point P (see FIG. 5). Accordingly, an urging force caused by the urging force difference between the first coil spring 91 and the second coil spring 92 is applied to the CS valve body 56 in the leftward axial direction corresponding to the valve opening direction so that the CS valve 57 is opened so as to communicate the Pc port 14 with the second Ps port 15 as illustrated in FIG. 3. Thus, a liquefied fluid is discharged from the control chamber 4 into the suction chamber 3 through the CS valve 57 in a short time and hence the responsiveness at the startup can be improved. Further, as described above, in the capacity control valve V, when the suction pressure Ps of the intermediate communication path 59 is high, the pressure-sensitive valve 53 is opened so that the control pressure Pc is promptly released to the second valve chamber 30 through the intermediate communication path 59 and the communication hole 83a of the drive rod 83. Accordingly, a liquefied fluid is discharged from the control chamber 4 into the suction chamber 3 in a short time by using two flow paths opened by the CS valve 57 and the pressure-sensitive valve 53 and hence the responsiveness at the startup can be improved.

Further, in the capacity control valve V of the embodiment, even when the control chamber 4 is in the maximum capacity state, the primary valve 50 is closed and the CS valve 57 is opened so that the Pc port 14 communicates with the second Ps port 15. Accordingly, the control pressure Pc and the suction pressure Ps can be maintained at the equal pressure (i.e., the same pressure). For this reason, since the stroke of the piston 7 in the cylinder 4a of the control chamber 4 is stabilized and the maximum capacity state is maintained, the operation efficiency can be improved.

Next, the non-energized state will be described. In the non-energized state, as illustrated in FIG. 4, the primary sub-valve body 51 and the pressure-sensitive valve member 52 are pressed the rightward axial direction by the urging force of the coil spring 63 constituting the pressure-sensitive body 61 so as to open the primary valve 50 and the primary sub-valve body 51 is stroked to the vicinity of the valve opened position in relation to the intersection point P (see FIG. 5), so that an urging force caused by the urging force difference between the first coil spring 91 and the second coil spring 92 is applied to the CS valve body 56 in the rightward axial direction corresponding to the valve closing direction and the CS valve 57 is closed as illustrated in FIG. 4. Accordingly, since the control fluid passing through the Pc port 14 does not flow into the second Ps port 15, the controllability when restarting the variable displacement compressor M after a short time elapses from the stop state is high and the operation efficiency of the capacity control valve V is high.

Next, the normal control state will be described. In the normal control state, the flow rate of the fluid from the Pd port 12 to the Pc port 14 is controlled by adjusting the opening degree and the opening time of the primary valve 50 according to the duty control of the capacity control valve V. Even when the primary valve 50 is slightly opened in the duty control of the capacity control valve V, the primary sub-valve body 51 is stroked to the valve opened position in relation to the intersection point P (see FIG. 5), so that an urging force caused by the urging force difference between the first coil spring 91 and the second coil spring 92 is applied to the CS valve body 56 in the rightward axial direction corresponding to the valve closing direction and the CS valve 57 is closed as illustrated in FIG. 4. Accordingly, since it is possible to prevent the leakage of the fluid from the Pc port 14 to the second Ps port 15, it is possible to improve the control accuracy of the control pressure Pc using the capacity control valve V.

Further, since the spring constant k1 of the first coil spring 91 is smaller than the spring constant k2 of the second coil spring 92 (i.e., k1<k2), the primary sub-valve body 51 is stroked to the valve opened position or the valve closed position in relation to the intersection point P after the urging force of the first coil spring 91 and the urging force of the second coil spring 92 are balanced at the intersection point P (see FIG. 5). Accordingly, since the urging force difference between the first coil spring 91 and the second coil spring 92 increases promptly, the CS valve 57 is reliably opened or closed.

Figure 6:
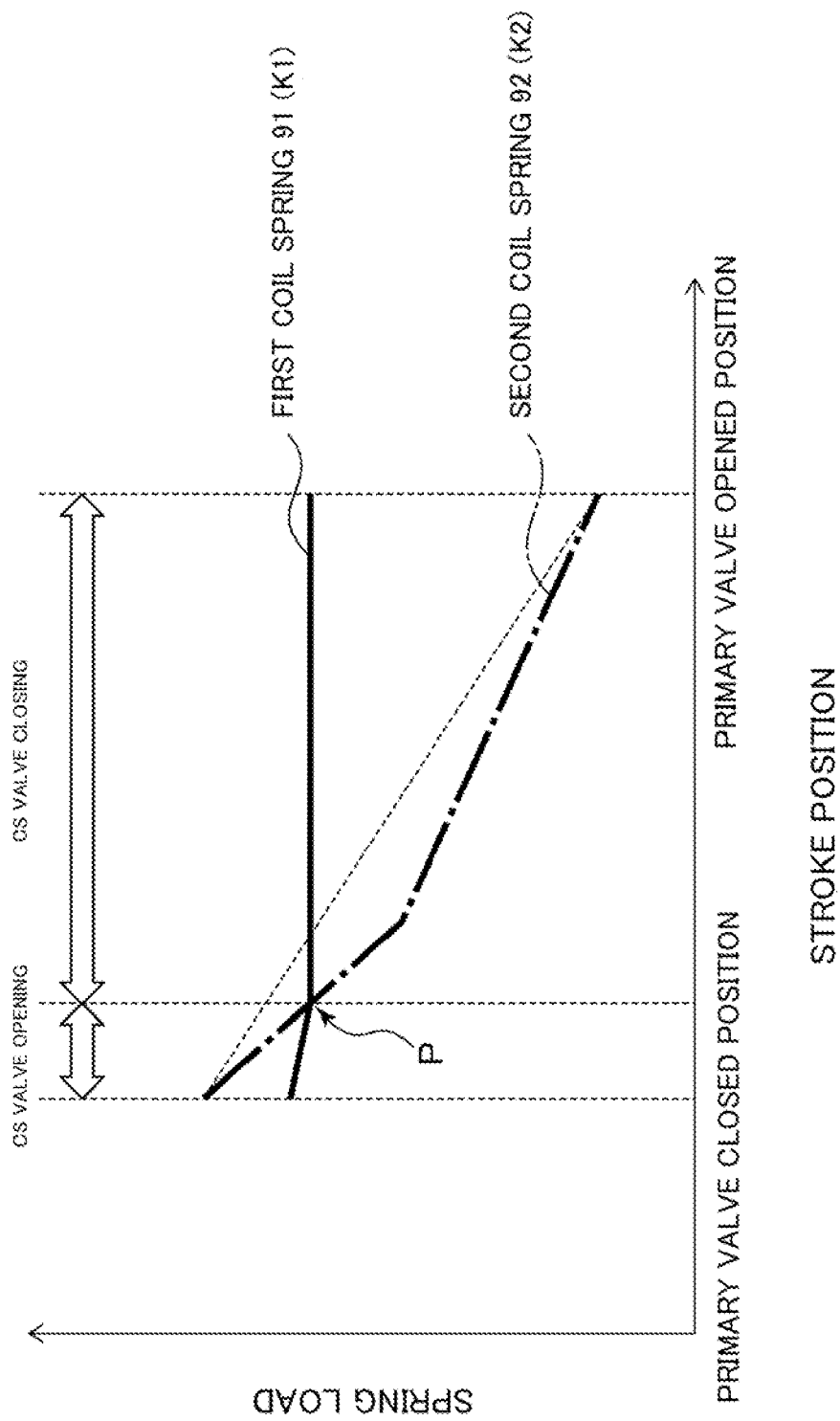
FIG. 6 is a graph showing a spring load acting on a first coil spring and a second coil spring with respect to a stroke position of a primary sub-valve body of a modified example of the capacity control valve according to the first embodiment, an opened and closed state of a primary valve, and an opened and closed state of a CS valve, where a stroke position of a horizontal axis indicates a movement direction of the primary sub-valve body (i.e., a direction from the left to the right in FIG. 2) when a current is applied to a solenoid.

Further, as shown in FIG. 6, since the spring constant k2 of the second coil spring 92 increases with a non-linear characteristic as the primary sub-valve body 51 is stroked to the valve closed position, in other words, the second coil spring 92 contracts so that the entire length is shortened, the primary sub-valve body 51 may be configured to open the CS valve 57 in the extreme vicinity of the valve closed position compared to the case of the linear characteristic shown in FIG. 5. In this way, the control accuracy of the capacity control valve V may be further improved.

Further, since the left axial end corresponding to one end of the second coil spring 92 is brought into contact with the bottom surface of the concave portion 56f of the CS valve body 56 and the left axial end corresponding to the other end thereof is brought into contact with the left axial end surface 52e of the flange portion 52c of the pressure-sensitive valve member 52 connected to the primary sub-valve body 51, the capacity control valve V with the CS valve 57 can have a simple structure.

Further, the CS valve body 56 has a substantially cylindrical shape, the inner periphery of the valve housing 10 is provided with the annular step portion 10f, and a part of the annular step portion 10f constitutes the CS valve seat 10d with and from which the protruding end portion 56a of the CS valve body 56 is brought into contact and separated, the capacity control valve V with the CS valve 57 can have a simple structure.

Further, the CS valve body 56 is disposed so that the outer peripheral surface of the base portion 56b is slidable on the inner peripheral surface 10e of the valve housing 10 and the outer peripheral surface of the contact portion 56c is slidable on the inner peripheral surface 10c of the valve housing 10, the capacity control valve V with the CS valve 57 can have a simple structure.

Further, since the capacity control valve V has a structure in which the CS valve body 56, the first coil spring 91, and the second coil spring 92 are inserted from the left axial end of the valve housing 10 into the pressure-sensitive chamber 40 and the partition adjustment member 11 is press-fitted and fixed thereto, the assembling is simple.

Further, since the Pc port 14 is disposed at a position closer to the Pd port 12 than the second Ps port 15, the discharge pressure Pd can be easily transferred to the control chamber 4 during control.

Second Embodiment

A capacity control valve according to a second embodiment of the present invention will be described with reference to FIG. 7. Additionally, the same components as those of the first embodiment will not be described.

Figure 7:
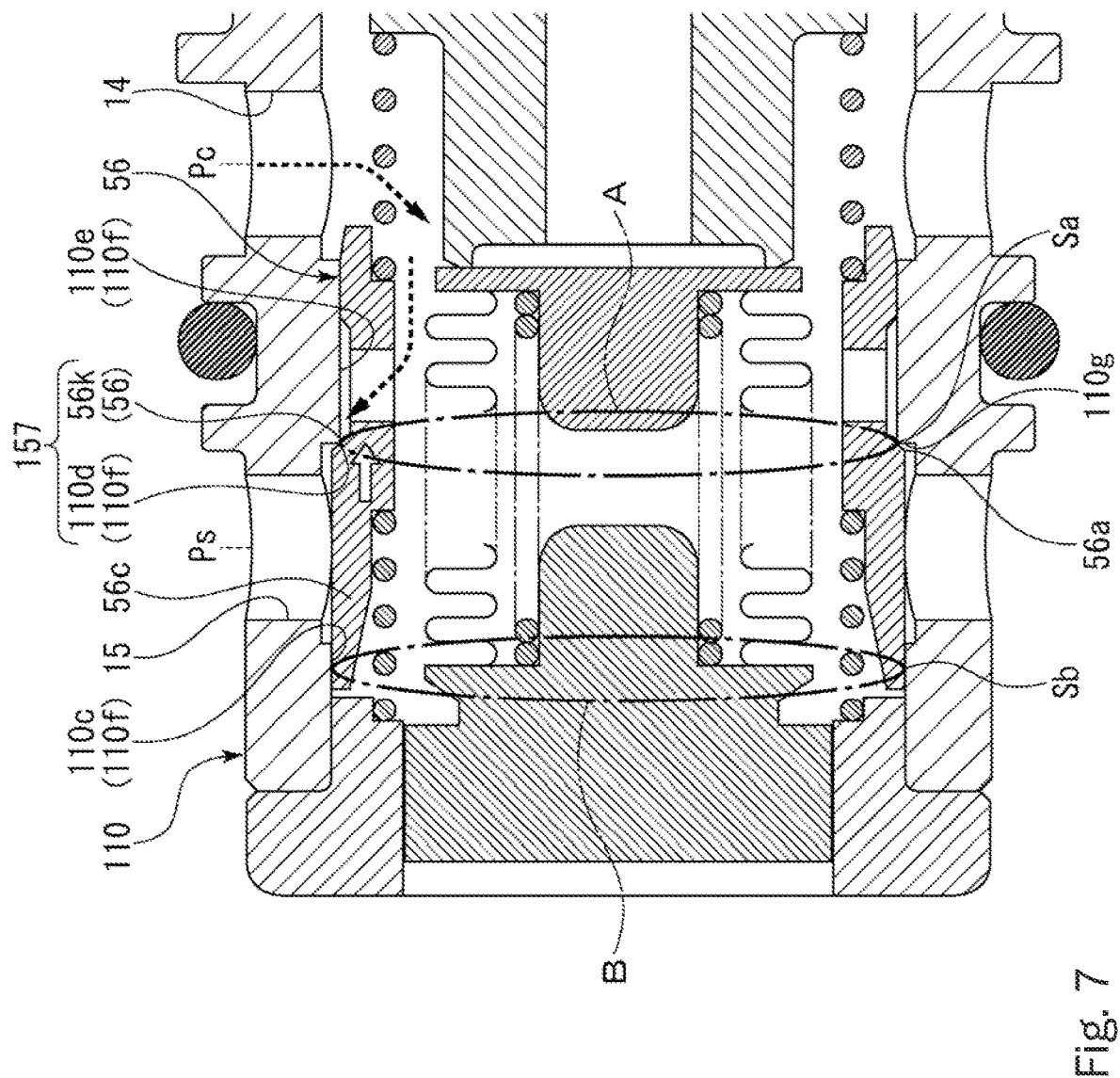
FIG. 7 is an enlarged cross-sectional view illustrating a case in which a primary valve is opened and a CS valve is closed in a non-energized state of a capacity control valve according to a second embodiment of the present invention.

In the capacity control valve V according to the second embodiment, as illustrated in FIG. 7, a CS valve 157 includes the CS valve body 56 and a CS valve seat 110d formed on an inner peripheral surface of a valve housing 110 and the CS valve 157 is opened and closed when a taper surface 56k formed at the substantial center of the outer peripheral surface of the CS valve body 56 in the axial direction is brought into contact with and separated from the CS valve seat 110d.

Specifically, an annular step portion 110f is formed in the valve housing 110 by an inner peripheral surface 110c which is provided with the second Ps port 15 extending from the left axial end surface of the valve housing 110 the rightward axial direction, a side surface 110g which extends inward in the radial direction from the right axial end of the inner peripheral surface 110c so as to be substantially orthogonal to the axial direction, and an inner peripheral surface 110e which extends the rightward axial direction from the inner radial side of the side surface 110g. Further, the CS valve seat 110d with and from which the taper surface 56k of the CS valve body 56 is brought into contact and separated is formed on the inner radial side of the left axial end of the annular step portion 110f, that is, an end portion formed by the side surface 110g and the inner peripheral surface 110e. In addition, the sealing portion Sa in which the taper surface 56k of the CS valve body 56 is brought into contact with the CS valve seat 110d and the sealing portion Sb in which the outer peripheral surface of the contact portion 56c of the CS valve body 56 slides on the inner peripheral surface 110c of the valve housing 110 are formed.

In the second embodiment, the pressure receiving area of the sealing portion Sa, that is, the pressure receiving seal diameter A is smaller than the pressure receiving area of the sealing portion Sb, that is, the pressure receiving seal diameter B (i.e., B>A). Accordingly, when closing the CS valve 157, a force Pc(B-A) caused by the control pressure Pc is applied to the CS valve body 56 the rightward axial direction and a force Ps(B-A) caused by the suction pressure Ps is applied thereto in the leftward axial direction. That is, a force ΔF defined by Pc(B-A)-Ps(B-A) is applied to the CS valve body 56 on the assumption that the right direction is a positive direction. Then, in the case of Pc≥Ps, since a force ΔF applied to the CS valve 157 in the rightward axial direction corresponding to the valve closing direction is generated by the differential pressure between the control pressure Pc and the suction pressure Ps, the CS valve 157 is easily maintained in the closed state.

Additionally, in the embodiment, a case in which the pressure receiving seal diameter A of the sealing portion Sa is set to be smaller than the pressure receiving seal diameter B of the sealing portion Sb (i.e., B>A) by forming an end portion in the valve housing 110 as the CS valve seat 110d has been described, but the present invention is not limited thereto. For example, the pressure receiving seal diameter of the sealing portion Sa may be set to be smaller than the pressure receiving seal diameter of the sealing portion Sb by changing the shape of the CS valve body or the shape of the valve housing 110 in the contact and separation portion with respect to the CS valve seat 110d. In this way, the pressure receiving areas of the sealing portions Sa and Sb may be set so that a differential pressure between the control pressure Pc and the suction pressure Ps is applied in the leftward axial direction corresponding to the valve opening direction of the CS valve 157.

Although the embodiments of the present invention have been described above with reference to the drawings, a detailed configuration is not limited to these embodiments and modifications or additions in the scope not departing from the spirit of the present invention are also included in the present invention.

For example, an example in which the primary sub-valve body 51 and the pressure-sensitive valve member 52 are formed as separate members has been described, but both members may be integrated with each other.

Further, a fixed orifice and a communication path directly communicating the control chamber 4 of the variable displacement compressor M with the suction chamber 3 may not be provided.

Further, in the above-described embodiment, the sub-valve may not be provided and the right axial end of the primary sub-valve body does not always need to have a sealing function when the right axial end functions as a support member that receives an axial load.

Further, the first coil spring 91 corresponding to the first spring and the second coil spring 92 corresponding to the second spring are not limited to the compression springs, but may be tension springs or may have a shape other than a coil shape.

Further, the pressure-sensitive body 61 may not use a coil spring therein.

REFERENCE SIGNS LIST

1 Casing
2 Discharge chamber
3 Suction chamber
4 Control chamber
10 Valve housing
10a Primary valve seat
10b Guide surface
10c Inner peripheral surface
10d CS valve seat
10e Inner peripheral surface
10f Annular step portion
11 Partition adjustment member
11a Right axial end surface
11b Concave portion
12 Pd port (discharge port)
13 First Ps port (suction port, first suction port)
14 Pc port (control port)
15 Second Ps port (suction port, second suction port)
20 First valve chamber
30 Second valve chamber
40 Pressure-sensitive chamber
50 Primary valve
51 Primary sub-valve body (primary valve body, hollow rod)
51a Left axial end
51b Right axial end
52 Pressure-sensitive valve member (hollow rod)
52a Pressure-sensitive valve seat
52b Cylindrical portion
52c Flange portion
52d Contact portion
52e Left axial end surface
53 Pressure-sensitive valve (pressure drive valve)
55 Sub-valve
56 CS valve body
56a Protruding end portion
56b Base portion
56c Contact portion
56d Annular concave portion
56e Through-hole
56f, 56g Concave portion
56h Left axial end
56k Taper surface
57 CS valve 59 Intermediate communication path (hollow communication path)
61 Pressure-sensitive body
62 Bellows core
63 Coil spring
70 Cap
70a Seal surface
80 Solenoid
82 Fixed iron core
82a Sub-valve seat
91 First coil spring (first spring)
92 Second coil spring (second spring)
110 Valve housing
110d CS valve seat
157 CS valve
P Intersection point
Pc Control pressure
Pd Discharge pressure
Ps Suction pressure
Sa, Sb Sealing portion
V Capacity control valve

The invention claimed is:

1. A capacity control valve comprising:
a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough;
a primary valve including a primary valve seat and a primary valve body driven by a solenoid and opening and closing a communication between the discharge port and the control port by a movement of the primary valve body; and
a control-suction valve which includes a control-suction valve body, a first spring configured to urge the control-suction valve body in a closing direction of the control-suction valve, and a second spring configured to urge the control-suction valve body in an opening direction of the control-suction valve,
the control port and the suction port being opened at a valve closed position of the primary valve body,
the control port and the suction port being closed at a valve opened position of the primary valve body,
wherein the capacity control valve further comprises a pressure drive valve which is opened and closed in accordance with the suction pressure, and
the primary valve body constitutes a part of a hollow rod provided with a hollow communication path capable of causing the control port to communicate with the suction port by opening and closing the pressure drive valve.

2. The capacity control valve according to claim 1, wherein a spring constant of the first spring is smaller than a spring constant of the second spring.

3. The capacity control valve according to claim 1, wherein a first end of the second spring is brought into contact with the control-suction valve body and a second end of the second spring is brought into contact with the primary valve body or a member connected to the primary valve body.

4. The capacity control valve according to claim 1, wherein the control-suction valve body has a cylindrical shape, an inner periphery of the valve housing is provided with an annular step portion, and a part of the annular step portion constitutes a control-suction valve seat with and from which the control-suction valve body is brought into contact and separated.

5. The capacity control valve according to claim 1, wherein the control-suction valve body is disposed so as to slidable on an inner periphery of the valve housing.

6. The capacity control valve according to claim 1, wherein the spring constant of the second spring increases with a non-linear characteristic as an entire length of the second spring is shortened.

7. The capacity control valve according to claim 1, wherein the first spring and the second spring are coil springs.

8. The capacity control valve according to claim 1, wherein the suction port includes a first suction port and a second suction port,
the first suction port, the discharge port, the control port, and the second suction port being sequentially disposed from a side of the solenoid.

9. The capacity control valve according to claim 1, wherein the control-suction valve includes sealing portions on both sides in an opening and closing direction thereof, the sealing portions having pressure receiving areas different from each other.

10. The capacity control valve according to claim 2, wherein a first end of the second spring is brought into contact with the control-suction valve body and a second end of the second spring is brought into contact with the primary valve body or a member connected to the primary valve body.

11. The capacity control valve according to claim 2, wherein the control-suction valve body has a cylindrical shape, an inner periphery of the valve housing is provided with an annular step portion, and a part of the annular step portion constitutes a control-suction valve seat with and from which the control-suction valve body is brought into contact and separated.

12. The capacity control valve according to claim 2, wherein the control-suction valve body is disposed so as to slidable on an inner periphery of the valve housing.

13. The capacity control valve according to claim 2, wherein the spring constant of the second spring increases with a non-linear characteristic as an entire length of the second spring is shortened.

14. The capacity control valve according to claim 2, wherein the first spring and the second spring are coil springs.

15. The capacity control valve according to claim 2, wherein the suction port includes a first suction port and a second suction port,
the first suction port, the discharge port, the control port, and the second suction port being sequentially disposed from a side of the solenoid.

16. The capacity control valve according to claim 2, wherein the control-suction valve includes sealing portions on both sides in an opening and closing direction thereof, the sealing portions having pressure receiving areas different from each other.

17. The capacity control valve according to claim 3, wherein the spring constant of the second spring increases with a non-linear characteristic as an entire length of the second spring is shortened.

18. A capacity control valve comprising:
a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough;

a primary valve including a primary valve seat and a primary valve body driven by a solenoid and opening and closing a communication between the discharge port and the control port by a movement of the primary valve body; and a control-suction valve which includes a control-suction valve body, a first spring configured to urge the control-suction valve body in a closing direction of the control-suction valve, and a second spring configured to urge the control-suction valve body in an opening direction of the control-suction valve, the control port and the suction port being opened at a valve closed position of the primary valve body, the control port and the suction port being closed at a valve opened position of the primary valve body, wherein the suction port includes a first suction port and a second suction port, the first suction port, the discharge port, the control port, and the second suction port being sequentially disposed from a side of the solenoid.

19. The capacity control valve according to claim 18, wherein a spring constant of the first spring is smaller than a spring constant of the second spring.

20. The capacity control valve according to claim 18, wherein a first end of the second spring is brought into contact with the control-suction valve body and a second end of the second spring is brought into contact with the primary valve body or a member connected to the primary valve body.

\* \* \* \* \*